Dec. 30, 1969 O D PARHAM 3,487,315

CURRENT PULSE CIRCUIT

Filed Oct. 7, 1966

O D Parham,
INVENTOR.
BY.
Robert Thompson
ATTORNEY.

3,487,315
CURRENT PULSE CIRCUIT

O D Parham, Downey, Calif., assignor to Hughes Aircraft Company, Culver City, Calif., a corporation of Delaware Filed Oct. 7. 1966, Ser. No. 585,122
Int. Cl. H03k 3/04
U.S. Cl. 328—59 23 Claims

ABSTRACT OF THE DISCLOSURE

A current transformer having a control winding with a voltage eliminating diode connecting thereacross, two opposite polarized sense windings, and an output winding; a differential amplifier responsive to the sense windings signals; and an amplifier means responsive to differential amplifier signals for producing an output current that is fed back to the output winding producing a flux to balance out the flux produced by the control winding.

This invention relates generally to pulse circuits, and more particularly to improvements in a current pulse amplifier and regulator of the type that can be utilized as a current driver for a coincident current memory.

In the pulse circuit technology, the reliability of the circuit operation is enhanced by providing accurate current signals. For example, in digital computers, it is necessary to provide current driver circuits capable of generating accurate current pulses for use with coincident current magnetic memory cores. Preferably the current signal should have a waveform with a fast rise time, low overshoot, a minimum of droop, and a low backswing voltage, under a variety of load and operating conditions.

Accordingly, it is an object of this invention to provide an improved current pulse circuit which approximates the above pulse waveform characteristics.

Another object of this invention is to provide an improved accurate current pulse driver of the type that can be utilized with magnetic memories.

Still another object is to provide a simple, easily adjusted current regulator that will provide precision currents under a variety of operating conditions.

Yet another object is to provide an improved means for arithmetically combining electrical signals as current signals.

Other objectives of this invention can be attained by providing a circuit having a precision voltage source which applies a signal across a control winding of a multiple winding current transformer. The resulting signals induced in sense windings of the current transformer operably control a differential amplifier. The output from the differential amplifier controls the level of an amplified feedback signal which is fed through output windings of the current transformer to drive a load such as magnetic memory cores coupled to a memory drive line. When the fluxes are balanced between the windings of the transformer, the current pulse circuit is maintained at a substantially steady level until the circuit is turned off, whereupon the current pulse waveform quickly recovers.

Other objects, features and advantages of this invention will become apparent upon reading the following detailed description of an embodiment, and referring to the accompanying drawings, in which.

Figures 1, 3:
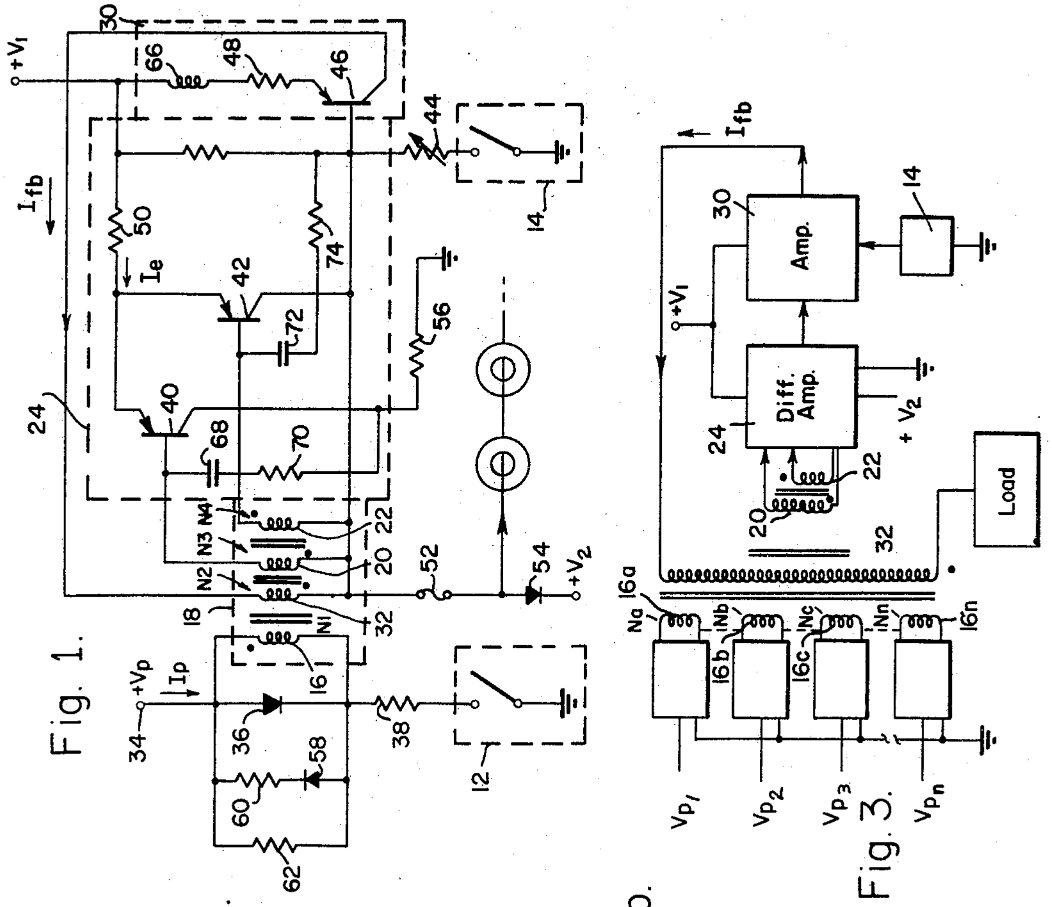
FIG. 1 is a schematic diagram illustrating the circuit relationship between a precision voltage source, a four-winding current transformer, a differential amplifier, and a feedback amplifier.
FIG. 3 is a circuit diagram of an embodiment operating as a current summing circuit.

Now referring to the operation of the current pulse circuit illustrated in FIG. 1, when the switches 12 and 14 are closed, current flows through a control winding 16 of a four-winding current transformer 18. The flux developed by the control winding 16 induces a corresponding voltage signal across sense windings 20 and 22 which operably control a differential amplifier 24. The output of the differential amplifier 24, as will be explained in more detail shortly operably controls the current level of a feed back signal $I_{fb}$ fed from an amplifier 30 through an output winding 32 of the current transformer 18. When a maximum flux level is reached by the control winding 16, the flux of the output winding 32 becomes more dominant and causes a decrease in the voltage signals developed thereacross and developed across the sense windings 20 and 22. The change in the signal developed across the sense windings 20 and 22 changes the output level of the differential amplifier 24 which, in turn, sets the level of the feedback signal $I_{fb}$ from the amplifier 30 so that the current transformer 18 is maintained at a steady operating state. At the end of the pulse duration, the switches 14 and 12 are opened, thereby causing the current transformer to recover to its normal state.

Referring now to the operation of the current pulse circuit of FIG. 1 in more detail, the switches 12 and 14 are first closed, enabling the circuit to generate a current pulse signal. Preferably the switches 12 and 14 should be closed simultaneously. However, switch 12 must not be closed after switch 14. Although the switches 12 and 14 are illustrated schematically, it should be understood that high speed electronic switches such as a "DTμL 944 Dual Power Gate Element" which is a dual input diode transistor inverter driver manufactured by the Fairchild Semiconductor Company and described in their brochure, "DTμL 932 and DTμL 944" dated May 1965, could be used.

With the switch 12 closed, a control signal is fed to the current transformer 18. More specifically, a precision voltage, $V_p$, applied to a terminal 34, causes a current to flow through a circuit, including the control winding 16 of the current transformer 18 and a diode 36 connected in parallel with the control winding 16, and through a precision resistor 38 and the switch 12 connected in series with the parallel circuit elements. Since the forward bias voltage across the diode 36 is low and substantially constant, the voltage signal developed across the control winding 16 is kept low and substantially constant. Initially, the major portion of the current flows through the parallel circuit branch including the diode 36. The current flow through the control winding 16 initially starts at a low level and increases at the constant rate $$\frac{di}{dt}=\frac{e}{L}$$

where:

$e$=the forward bias voltage across diode 36, and
L=inductance of control winding 16.

The maximum current flow $I_p$ through the control winding 16 and the diode 36 is substantially fixed by the precision voltage $V_p$ and the resistance $R_p$ of the precision resistor 38 since the impedances of the control winding 16 and the diode 36 are relatively low and substantially constant. Of course, the voltage level of the precision voltage $V_p$ can be adjusted by a thermistor coupled to a memory core stack whereby a preferred current level can be selected for precision current $I_p$.

Figures 2A, 2B:
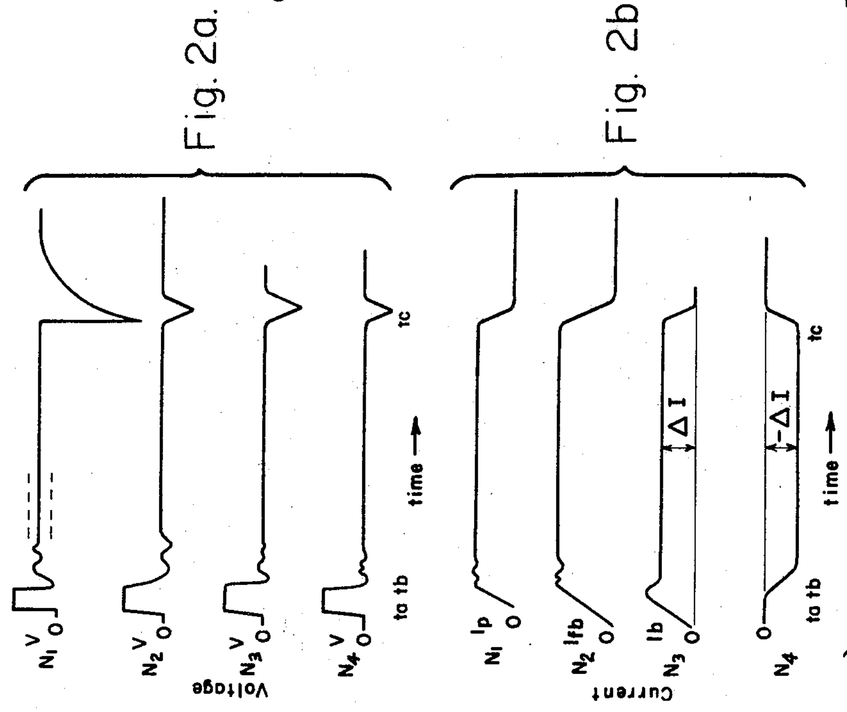
FIGS. 2*a* and 2*b* are timing diagrams illustrating the pulse waveform of the voltage signals and the current signals, respectively, associated with corresponding transformer windings.

As a result of the constant rate of current increase, the waveform of the voltage developed across the control winding 16 has a flat table, as indicated starting at the time $t_a$ in the timing diagram of FIG. 2*a*. Thereafter, the voltage level remains constant until a time $t_b$ is reached, as will be now explained. During circuit operation, the voltage signal developed across the control winding 16 of the current transformer 18 is also developed across the sense windings 20 and 22. The voltage level is stepped down at a ratio of 2 to 1 since the sense windings have 15 turns ($N_3=N_4=15T$) and the control winding 16 has 30 turns ($N_1=30T$). As a result, when measured with the polarity dots as the reference terminal, the voltage waveforms will have a shape substantially similar to the shape of the voltage waveform across the control winding 16 except for the leading edge thereof, which has a slightly longer rise time. It should, of course, be noted that the amplitudes of the illustrated voltage waveforms are not scaled in accordance with the above noted voltage ratios. The voltage signals developed across the sense windings 20 and 22 are fed to two input terminals of the differential amplifier 24.

During the current regulating time interval between the times $t_a$ and $t_b$ (100 nsecs.), the following circuit operation occurs. Starting at time $t_a$, the voltages developed across the oppositely polarized sense windings 20 and 22 are applied to the base terminals of transistors 40 and 42 respectively in the differential amplifier 24. Transistor 40 is forward base biased to turn it on, and transistor 42 is reverse base biased to hold it off. Thereafter, this operating condition remains constant until time $t_b$.

Referring back to the circuit operation starting at time $t_a$, a controlled current feedback signal $I_{fb}$ is fed to the output winding 32 from the amplifier 30. More specifically, the closure of switch 14 at the time $t_a$ enables current to flow through potentiometer 44 and to the base terminal of transistor 46 in amplifier 30. This base current results in a collector current flow $I_{fb}$ from transistor 46, which is fed back through the output winding 32 of the current transformer 18. Since the control winding 16 is dominant during the time interval between $t_a$ and $t_b$ when it is taking increasing amounts of current from the diode 36, the waveform of the fed back current signal $I_{fb}$ through output winding 32 and the voltage signal developed thereon have waveforms substantially identical to the waveforms of the corresponding electrical signals related to the control winding 16. In other words, the current waveform has a constant rate increase rise time and the voltage waveform has a flat table. The instantaneous amplitude of the output current $I_{fb}$ signal is, however, greater than that of the current through control winding 16 by a ratio of $$I_{fb}=\frac{N_1}{N_2}\times I=10\times I$$

where:

$N_1$=30 turns, and
$N_2$=3 turns, and
I=current through control winding

These currents continue to follow one another, thereby balancing out their respective fluxes until the time $t_b$ is reached.

At the time $t_b$, the control winding 16 has taken the maximum amount of current away from the circuit branch, including the diode 36. Thereafter, the precision voltage $V_p$ applied to terminal 34 and the precision resistor 38 fix the constant level of current flow (about $I_p$) through the control winding 16. As a result, the rate of increase in current flow through the control winding 16 and output winding 32 become zero$=di/dt=0$, thereby decreasing the voltage generated across the windings of the current transformer 18 to a nominal zero volts when the slight oscillatory operation has damped out.

In addition, at the time $t_b$, the output winding 32 becomes the dominant winding and controls the operation of the the pulse circuit by means of signals fed back to the differential amplifier 24. The feedback voltage signals in the sense windings 20 and 22 decrease toward zero, thereby forward biasing the transistor 42 of the differential amplifier 24. As will be explained in more detail shortly, the voltage signals developed across the windings of the current transformer 18 will go to a nominal zero volts when the pulse circuit is fully regulated and stabilized.

The feedback current signals in the sense windings 20 and 22 are such that, with transistors 40 and 42 forward biased and conducting, the base currents flowing through the sense windings ideally must balance each other, thereby minimizing the possibility of the addition of error to the fluxes produced by the control winding 16 and the output winding 32.

In operation, when transistor 42 of differential amplifier 24 is forward biased, a base current flows through the sense winding 20 and causes an increase in the collector current of transistor 42. The collector current of transistor 42 in turn robs current from the base terminal of transistor 46 in amplifier 30. As the base current available to transistor 46 is so decreased, the collector current thereof $I_{fb}$ tends to stabilize. As the stabilizing collector current $I_{fb}$ is fed through the output winding 32 of transformer 18, the flux developed therein also tends to stabilize. During this time, the base current flowing through sense winding 22 to transistor 42 progressively increases to a level $+\Delta I$, while at the same time, the base current flowing through sense winding 20 to transistor 40 progressively decreases an amount $-\Delta I$ equal to the amount of current increase through sense winding 22. As a result, the aiding and opposing fluxes developed across the individual windings of the current transformer 18 tend to balance one another. Once the flux generated by the output winding 32 and the sense windings 20 and 22 balance the flux generated by the control winding 16, the circuit stabilizes:

$$N_1I_p=N_2I_{fb}-N_3I_b+N_4I_b$$

As a result, the output current $I_o$ through fuse 52 stabilizes. Thereafter, the transistors 40 and 42 act as a differential amplifier to maintain this balance.

The current pulse rise time characteristics of the feedback signal $I_{fb}$ can be greatly improved by making the voltage $V_1$ applied to the amplifier 30 and differential amplifier 24 greater than the voltage $V_2$ applied to the cathode of diode 54 and not driving the transistor 46 to saturation. Diode 54 thus operably provides a current sink for the transistors 46 during current rise time through the output winding 32 to the memory drive line. Consequently, for a fixed inductive load, the current rise time into the load may be effectively controlled by the voltage applied to the cathode of diode 54.

The stabilizing of the flux in transformer 18 causes the output impedance of the circuit presented to the anode of diode 54 and the memory drive line to be high, thereby satisfying the requirement of a current source. This output impedance is independent of the output impedance of transistor 46 as long as transistor 46 is not saturated or turned off.

The current transformer 18 is constructed with windings having low turn ratios wound in bifilar relationship to one another, on a linear ferrite core.

With the low turn ratios, the leakage inductance from the output winding 32 to the sense windings 20 and 22 is minimized so that the inductance presented to the base terminals of the transistors 40 and 42 of the differential amplifier 24 is minimized, thereby minimizing feedback oscillations. In addition, the input impedance or inductance of control winding 16 is low, thereby holding the volt time integral developed across the windings to a low value. As a result, the transformer will produce pulse signals having a fast rise time and fast fall time for a fast current pulse forming operation.

With the windings wrapped in bifilar relationship, the capacitances between the different terminals of the transformer are balanced relative to one another; thus the balanced capacitances operate so that the capacitive currents are also balanced relative to one another when employed in feedback operation. For example, the capacitances between the output winding 32 and the sense windings 20 and 22 are balanced and prevent a *dv/dt* feedback signal from the load to the differential amplifier from acting like a differential driver. Instead, the feedback signal looks like a common mode feedback to the differential amplifier.

In addition, the voltage developed across the windings of current transformer 18 tend to become a nominal zero volts or a minimum value. For example, since the emitter current, $I_e$ to transistor 46 is proportional to the collector current, it also tends to stabilize, causing a stabilization in voltage drop $I_eR$ across resistor 48. As a result, the voltage at the common junction between sense windings 20 and 22 equals $$V_1 - I_eR - V_{eb}$$

where:

$V_{eb}$=emitter-base voltage of transistor 46
$I_eR$=voltage drop across resistor 48

Since the voltages developed across the sense windings 20 and 22 are decreasing to zero volts, the emitter currents $I_e$ flowing through resistor 50 also tends to stabilize. As a result, the voltage drop at the non-common terminals of sense windings 20 and 22 equal, respectively:

$$V_1 - I_eR - V_{eb}$$

for sense winding 20, where:

$I_eR$=voltage drop across resistor 50
$V_{eb}$=the emitter-based voltage of transistor 40 and $$V_1 - I_eR - V_{eb}$$

for sense winding 22,
where:

$I_eR$=voltage drop across resistor 50
$V_{eb}$=the emitter-based voltage of transistor 42.

Once stabilized, the transistors 40 and 42 act as a differential amplifier to maintain the balanced operating condition.

Ideally, the values of resistance 56 and potentiometer 44 are set so that the levels of the collector currents of transistor 40 and transistor 42 are equal. This operation causes the base current through sense winding 20 to transistor 40 and the base current through sense winding 22 to transistor 42 to balance, and thus prevents the base currents from contributing any error to the output signal $I_{fb}$ flowing through the output winding 32. As a result of the balanced operation and the low voltage across the current transformer windings, the droop in the pulse table during stable operation is minimized or is substantially zero. Of course, as will be explained in more detail later, the potentiometer 44 could be adjusted to increase the collector current of transistor 42 over the collector current of transistor 40 during regulated operation to thereby dissipate any energy stored in the windings of current transformer 18. Under such an operating condition, the recovery time is decreased or duty cycle is increased or modified at turn off.

For operating conditions with a minimum or near zero droop, the waveforms illustrated in the timing charts, FIGS. 2*a* and 2*b*, are representative of the signal waveforms in the current transformer 18. At turn off time $t_c$, which can be 100 microseconds after time $t_b$, the switches 14 and 12 are open circuited. Preferably the switches 14 and 12 should be opened simultaneously. However, switch 14 must not be opened later than switch 12.

With switch 14 open circuited, the base current to transistor 46 of amplifier 30 is significantly decreased to initiate turn off of the transistor 46. With transistor 46 turned off, the feedback signal $I_{fb}$ then decreases at the rate $-di/dt$. This decreasing current signal, $-di/dt$, induces a voltage signal which, when measured with the polarity dot as a reference terminal, is a negative pulse spike relative to the positive pulse signal that was generated for the leading edge of the signals.

In addition, with switch 12 open circuited, the current flowing through control winding 16 also becomes more negative at a rate $-di/dt$, causing a negative voltage pulse spike to be generated across the control winding.

In addition, the base currents flowing through the sense windings 20 and 22 decrease at a rate $-di/dt$, causing negative voltage pulse spikes to be developed across the sense windings. This quickly turns off the transistors 40 and 42 of the differential amplifier 24.

The energy stored in the windings is thereafter dissipated in the following manner, causing the voltage signals developed across the transformer windings to return to zero voltage level at an $L/R$ time constant rate. For example, the energy stored in control winding 16 is discharged through the now forward biased diode 58, connected in series with a resistor 60 and through the resistor 62 connected in parallel with them. The diode 58 prevents a large volt time integral from developing across the transformer winding during the fall time or trailing edge of the current pulse.

The current flowing through output winding 32 tends to follow the current flowing through control winding 16 and also decreases at the rate $-di/dt$ until a zero current level is reached. In addition, the currents through sense winding 20 decreases at a rate $-di/dt$, and the current in the sense winding 22 increases at the rate $-di/dt$, until zero current conditions are reached. The time for recovery of the circuit is 30 nanoseconds in one circuit that has been built.

As previously stated, if the droop in the pulse table is made slightly positive by controlling the operation of the differential amplifier 24 by means of the setting of potentiometer 44, the energy stored in the current transformer windings can be completely dissipated at the time $t_c$, thereby effectively eliminating the voltage pulse spikes illustrated in FIG. 2*a*. An advantage of this operation is that the recovery time is greatly decreased, thereby significantly increasing the duty cycle.

Of course, by making the pulse droop even more positive, it would be possible to develop a positive voltage spike during the fall time of the current pulse where a negative pulse spike is not desired.

To suppress oscillations in the operation of the circuit there is provided in the amplifier 30 a choke 66 which is coupled between the terminal at $V_1$ volts and the resistor 48. The choke 66 and the resistor 48 may, of course, be combined into one inductive resistor if desired. In operation, the choke 66 suppresses oscillations from the transistor 46 while passing DC emitter current to it. The differential amplifier 24 is stabilized from oscillating by a pair of series RC networks. One series RC network includes a capacitor 68 and a resistor 70 connected between the base terminal of transistor 40 and its collector terminal; the second RC network includes a capacitor 72 and a resistor 74 connected between the base terminal of transistor 42 and its collector terminal.

The features of this circuit can also be utilized in a current summing circuit in the manner illustrated in FIG. 3, in which a plurality of control windings are operable to produce an accurate combined current signal in the output winding 32. In operation, the magnetic flux produced by any combination of control windings **16*a* through 16*n* induces a magnetic flux in the sense windings 20 and 22 of the current transformer 18 in the manner previously described for the preceding embodiment. The resulting signal developed across the sense windings 20 and 22 operably affect the operation of the differential amplifier 24, thereby producing an output signal which, in turn, controls the level of the feedback current $I_{fb}$ generated by the amplifier 30. This feedback signal $I_{fb}$ is fed through the output winding 32** wherein the fluxes generated by all of the windings balance.

The flux produced by each of the control windings 16*a* through 16*n*, where *n* is any number, can be regulated by the level of the precision voltage signals $V_{p1}$ through $V_{pn}$ associated with the control windings. Thus, for example, for a binary weighted current summing circuit:

$V_{p1}=1$ volt
$V_{p2}=2$ volts
$V_{p3}=4$ volts
$V_{pn}=2^{n-1}$ volts

In such cases, the number of turns N in the windings 16*a* through 16*n* could all be equal.

However, where a single precision voltage level $V_p$ is to be used, the number of turns of the control windings 16*a* through 16*n* would be weighted in accordance with the summing function. For example, in a binarily weighted summing circuit, for control winding 16*a*, the number of turns$=N$; for control winding 16*b*, the number of turns$=2N$; for control winding 16*c*, the number of turns$=4N$, and for control winding 16*n*, the number of turns$=2^{n-1}\cdot N$.

Of course, the control windings 16*a* through 16*n* can be constructed as a single winding having a series of tap points, wherein all of the control windings, 16*a* through 16*n*, would be connected in series as indicated by the dashed line. Under these circumstances, the voltage signals would have to be switched in, one at a time.

In addition to a summing operation, the circuit could be utilized for a subtraction circuit or other arithmetic function by reversing the polarities of select ones of the control windings 16*a* through 16*n*.

Although the circuit is shown utilizing p-n-p transistors, it would be possible to construct a complementary circuit utilizing n-p-n transistors and reversing the polarity of the voltage signals. Furthermore, the differential amplifier 24 could be constructed with field effect transistors, thereby eliminating error-producing currents in the sense windings 20 and 22.

While the salient features have been illustrated and described with respect to several embodiments, it should be readily apparent that modifications can be made within the spirit and the scope of the invention, and it is therefore not desired to limit the invention to the exact details shown and described.

What is claimed is:

1. A circuit for producing accurate electrical current signals comprising:

a current transformer having control windings, sense windings, and output windings, each inductively coupled to one another;

means responsive to a voltage signal for applying a current signal to said control windings, said control windings producing a magnetic flux which is coupled to said sense windings and said output windings; and amplifier means coupled to said sense windings and being responsive to electrical signals developed thereat, for producing an output current signal related to the current signal applied to said control windings, said amplifier means being further coupled to feed the output current signal through said output windings of said current transformer, the flux produced by said output windings operably balancing out the flux produced by said control winding.

2. The circuit of claim 1 in which said amplifier means includes transistor means having control terminal means coupled to said sense windings, and an output terminal coupled to pass the output current signal to said output windings, said output terminal having a high output impedance,

3. The circuit of claim 1 in which said sense windings include a first sense winding and a second sense winding, each oppositely polarized relative to one another; and said amplifier means, including a differential amplifier means having a first input terminal coupled to one of said sense windings and a second input terminal coupled to the other of said sense windings for generating an output signal related to the signal developed across said control windings.

4. The circuit of claim 3 in said amplifier means further includes:

current amplifier means coupled to receive the output signal from said differential amplifier for generating an output current signal related to the signal developed across said control winding, and being further coupled to feed the current signal through said output windings.

5. The circuit of claim 4 in which said means responsive to a precision voltage signal includes a means coupled to limit the voltage developed across said control windings to a nominal zero volts, for maintaining the total energy stored in said current transformer low.

6. The circuit of claim 5 in which said control windings include a plurality of individual control windings, each selectively coupled to receive current signals from said means responsive to a voltage signal for producing individual magnetic flux signals associated with the current signal applied to and the turns ratios of individual control windings, the produced flux being coupled to said other windings.

7. The circuit of claim 3 in which said means responsive to a precision voltage signal includes a means coupled to limit the voltage developed across said control windings to near zero volts, for maintaining the total energy stored in said current transformer low.

8. The device of claim 7 further including first switch means coupled to selectively complete the circuit to said means responsive to a voltage signal, and second switch means for selectively completing the circuit to said amplifier means.

9. The circuit of claim 7 in which said sense windings and said output windings are bifilar wound to attain balanced capacitance therebetween.

10. The circuit of claim 3 in which said windings of said current transformer have a low total inductance.

11. The circuit of claim 10 in which said sense windings and said output windings are bifilar wound to attain balanced capacitance therebetween.

12. The circuit of claim 3 in which said sense windings and said output windings are bifilar wound to attain balanced capacitance therebetween.

13. The circuit of claim 12 in which said control windings include a plurality of individual control windings, each selectively coupled to receive current signals from said means responsive to a voltage signal for producing individual magnetic flux signals associated with the current signal applied to and the turns ratios of individual control windings, the produced flux being coupled to said other windings.

14. The circuit of claim 3 in which said control windings include a plurality of individual control windings, each selectively coupled to receive current signals from said means responsive to a voltage signal for producing individual magnetic flux signals associated with the current signal applied to and the turns ratios of individual control windings, the produced flux being coupled to said other windings.

15. The circuit of claim 2 in which said means responsive to a precision voltage signal includes a means coupled to limit the voltage developed across said control windings to a nominal zero volts, for maintaining the total energy stored in said current transformer low.

16. The circuit of claim 15 in which said windings of said current transformer have a low total inductance.

17. The circuit of claim 16 in which said control windings include a plurality of individual control windings, each selectively coupled to receive current signals from said means responsive to a voltage signal for producing individual magnetic flux signals associated with the current signal applied to and the turns ratios of individual control windings, the produced flux being coupled to said other windings.

18. The circuit of claim 2 in which said control windings include a plurality of individual control windings, each selectively coupled to receive current signals from said means responsive to a voltage signal for producing individual magnetic flux signals associated with the current signal applied to and the turns ratios of individual control windings, the produced flux being coupled to said other windings.

19. The circuit of claim 1 in which said means responsive to a precision voltage signal includes a means coupled to limit the voltage developed across said control windings to a nominal zero volts, for maintaining the total energy stored in said current transformer low.

20. The device of claim 1 further including first switch means coupled to selectively complete the circuit to said means responsive to a voltage signal, and second switch means for selectively completing the circuit to said amplifier means.

21. The circuit of claim 1 in which said windings of said current transformer have a low total inductance.

22. The circuit of claim 1 in which said control windings include a plurality of individual control windings, each selectively coupled to receive current signals from said means responsive to a voltage signal for producing individual magnetic flux signals associated with the current signal applied to and the turns ratios of individual control windings, the produced flux being coupled to said other windings.

23. The circuit of claim 3 further including means coupled to adjust the balance of said differential amplifier means whereby the droop of the output current waveform is controlled.

References Cited

UNITED STATES PATENTS 3,047,736 7/1962 Dornhoefer ---------- 307—314

JOHN S. HEYMAN, Primary Examiner

B. P. DAVIS, Assistant Examiner

U.S. Cl. X.R.

307—260, 314; 330—30